US012711172B2

(12) United States Patent
Chen et al.

(10) Patent No.: US 12,711,172 B2
(45) Date of Patent: Aug. 18, 2026

(54) TECHNIQUES FOR CUSTOMIZED TOPIC DETERMINATION FOR HIGH-VOLUME DOCUMENT COLLECTIONS

(71) Applicant: Adobe Inc., San Jose, CA (US)

(72) Inventors: Xiang Chen, San Jose, CA (US); Viswanathan Swaminathan, Saratoga, CA (US); Saayan Mitra, San Jose, CA (US); Camille Girabawe, San Francisco, CA (US); Sreekanth Reddy, Bangalore (IN)

(73) Assignee: Adobe Inc., San Jose, CA (US)

( * ) Notice: Subject to any disclaimer, the term of this patent is extended or adjusted under 35 U.S.C. 154(b) by 1063 days.

(21) Appl. No.: 17/845,437

(22) Filed: Jun. 21, 2022

(65) Prior Publication Data

US 2023/0409621 A1 Dec. 21, 2023

(51) Int. Cl.
*G06F 16/35* (2025.01)
*G06F 40/279* (2020.01)

(52) U.S. Cl.
CPC ............ *G06F 16/35* (2019.01); *G06F 40/279* (2020.01)

(58) Field of Classification Search
CPC ......... G06F 16/35; G06F 40/279; G06F 16/93
See application file for complete search history.

(56) References Cited

U.S. PATENT DOCUMENTS 11,341,337 B1 * 5/2022 Novak .................... G06F 40/30
2015/0310096 A1 * 10/2015 Bao ....................... G06F 16/367 707/738
2023/0315993 A1 * 10/2023 Nieborowski .......... G06F 16/35 704/9

OTHER PUBLICATIONS

Armand, et al., "FastText/Zip: Compressing Text Classification Model", https://github.com/facebookresearch/fastText, 2017.

(Continued)

*Primary Examiner* — Matthew Ell
(74) *Attorney, Agent, or Firm* — Kilpatrick Townsend & Stockton LLP

(57) ABSTRACT

A topic mapping system generates customized mapping schemas for multiple topic sets. The topic mapping system generates document clusters that represent groups of digital documents. The topic mapping system also generates, for each topic set, a document-topic mapping data object ("DTM data object") that describes a customized mapping schema of the document clusters to labels in the topic set. The topic mapping system identifies customized groups of documents for responding to multiple requests that have a particular keyword. For each request, the topic mapping system identifies a particular topic set and DTM data object associated with a computing system that provided the request. Based on the keyword, the topic mapping system identifies documents that are categorized according to the customized mapping schema in the DTM data object. The topic mapping system can provide customized groups of documents to respective computing systems that provided the multiple requests.

20 Claims, 5 Drawing Sheets

(56) References Cited

OTHER PUBLICATIONS

Blei, et al., "Latent Dirichlet Allocation", Journal of Machine Learning Research 3, 2003, 993-1022.
Devlin, et al., "Bert: Pre-training of Deep Bidirectional Transformers for Language Understanding", arXiv preprint arXiv:1810.04805, 2018.
Mikolov, et al., "Efficient Estimation of Word Representations in Vector Space", arXiv preprint, arXiv:1301.3781, 2013.
Minaee, et al., "Deep Learning—based Text Classification: A Comprehensive Review", ACM Computing Surveys (CSUR) 54.3, 2021, 1-40.

* cited by examiner

TECHNIQUES FOR CUSTOMIZED TOPIC DETERMINATION FOR HIGH-VOLUME DOCUMENT COLLECTIONS

TECHNICAL FIELD

This disclosure relates generally to the field of machine learning, and more specifically relates to techniques for automated mapping between topics and documents.

BACKGROUND

Collections of digital documents often undergo ongoing modifications. For example, a digital library of reference documents is subject to additions, removal, and updates for documents, including unstructured documents. The unstructured documents can include documents of a variety of document types. In addition, various users of a digital document collection may have different categorization requirements for the collection. For example, a user who is interested in educational uses for a particular document collection may wish to organize the digital documents differently from a user who is interested in workplace applications of the same document collection. In addition, categorization requirements may change over time, such as in response to new applications or areas of study. In some cases, changes to digital document collections or to categorization requirements of collections may include a large quantity of documents for human efforts at categorization. Additionally or alternatively, changes to digital document collections or to categorization requirements of collections may occur too quickly (e.g., multiple daily modifications) for human efforts at categorization.

Contemporary efforts to automatically categorize digital document collections are limited. In some cases, the inclusion of unstructured documents in a digital document collection can cause challenges for contemporary machine-learning techniques for document categorization. For example, machine-learning techniques for supervised learning of document topics require extensive training data with human-labeled documents. In some cases, supervised learning techniques may be unable to learn newly identified topics, such as if human-labeled training data are not available for the newly identified topics. In addition, machine-learning techniques for unsupervised learning of document topics can be limited to phrases that are included in the digital document collection that is being categorized. If a document curator requests a subset of documents associated with a newly identified topic, unsupervised learning techniques may be unable to match the newly identified topic to any documents. In some cases, contemporary techniques, including supervised learning techniques or unsupervised learning techniques, may require additional training for modifications to a document collection or to topics. For example, if multiple newly identified topics are provided to a contemporary categorization system that uses supervised or unsupervised learning techniques, the contemporary system may require resource-intensive training or analysis of the existing document collection, in order to apply the newly identified topics to the digital documents.

SUMMARY

According to certain embodiments, a topic mapping system generates customized mapping schemas for multiple topic sets. Based on data describing a collection of digital documents, the topic mapping system generates document clusters that represent groups of the documents, such as a document cluster representing documents with similar content. The topic mapping system also generates, for each topic set, a document-topic mapping data object ("DTM data object") that describes a customized mapping schema of the document clusters to labels in the topic set. In response to multiple document requests with a particular keyword, the topic mapping system identifies customized groups of documents for responding to the requests. For each request, the topic mapping system identifies a particular topic set and DTM data object associated with a computing system that provided the request. Based on the keyword in the request, the topic mapping system identifies documents that are categorized according to the customized mapping schema in the identified DTM data object. In some cases, the topic mapping system can generate a response for an example request by identifying particular documents that are categorized according to a particular identified DTM data object. The topic mapping system can provide the customized groups of documents to the respective computing systems that provided the multiple requests.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
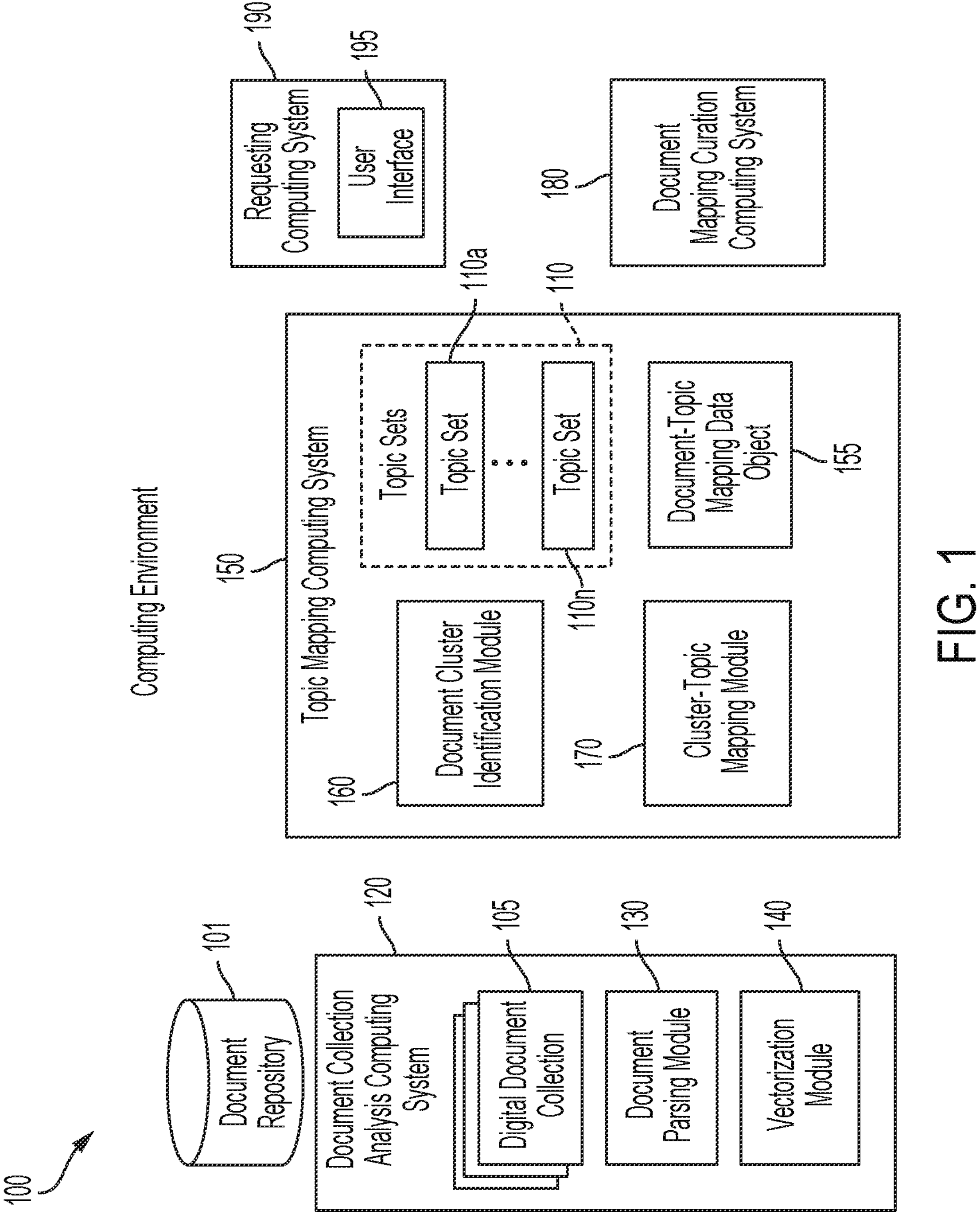
FIG. 1 is a block diagram depicting an example of a computing environment in which customized topics are determined for digital documents, according to certain embodiments.

As discussed above, prior techniques for categorization of digital document collections do not provide reliable categorization for unstructured documents, such as text documents, presentations slides, print-formatted documents, webpage-formatted documents, or other types of documents. Additionally or alternatively, prior techniques for categorization of digital document collections do not provide reliable categorization for a modified document collection or newly identified topics. In some cases, prior techniques for categorization of digital document collections could require large amounts of training data related to a modified document collection or newly identified topics, such as human-labeled training data that indicates categorizations for the modified documents in the newly identified topics.

Certain embodiments described herein provide for a topic mapping computing system that is capable of identifying a customized mapping schema between a set of topics and a digital document collection, such as a digital document collection that includes unstructured documents. In some cases, the topic mapping computing system identifies the customized mapping schema with improved speed and accuracy as compared to contemporary techniques for categorization, such as by identifying the customized mapping schema without additional analysis of training data. In addition, the topic mapping computing system identifies multiple customized mapping schemas for various respective sets of topics.

The following examples are provided to introduce certain embodiments of the present disclosure. A topic mapping system receives data, such as document vector data, describing a digital document collection. The example topic mapping system also receives multiple topic sets that include various topic labels. In this example, the topic labels could include labels such as "network setup," "password strength," "anti-virus software," or any other suitable topic labels. The topic sets are associated with various characteristics of computing systems, such as a network domain, user login data, or other characteristics. For example, the topic mapping system could receive multiple topic sets from a computing system associated with an educational institution. A first topic set could be associated with first characteristics, such as login data for employees of the educational institution, and a second topic set could be associated with second characteristics, such as login data for students of the educational institution.

Based on the document vector data, the example topic mapping system generates document clusters that represent the digital documents in the collection. In addition, the topic mapping system generates multiple document-topic mapping data objects that map the document clusters to the multiple topic sets. Each document-topic mapping data object ("DTM data object") describes a customized mapping schema that categorizes the document clusters according to the labels in a particular one of the topic sets. For example, a first DTM data object categorizes the document clusters according to the labels in the first topic set, and a second DTM data object categorizes the document clusters according to the labels in the second topic set.

The example topic mapping system receives multiple requests for documents in the digital document collection. The requests can include a particular keyword, such as "network setup." In addition, the requests can be received from multiple requesting computing systems with the various characteristics associated with the topic sets. For example, a first request is received from a first computing system used by an employee of the educational institution, and a second request is received from a second computing system used by a student of the educational institution. The topic mapping system generates multiple responses that are customized for the requesting computing systems, based on the DTM data objects that are associated with the topic sets. Based on characteristics in the first request, the topic mapping system identifies that the first computing system is associated with the first topic set. The topic mapping system identifies a first group of documents based on the first DTM data object, such as documents that describe network architecture, employee network parameters, or other documents with content that is suitable for an employee of the educational institution. The topic mapping system provides the first group of documents to the first computing system in response to the first request. In addition, based on characteristics in the second request, the topic mapping system identifies that the second computing system is associated with the second topic set and identifies a second group of documents based on the second DTM data object, such as documents that describe student login information or other documents with content that is suitable for a student of the educational institution. The topic mapping system provides the second group of documents to the second computing system in response to the second request Certain embodiments described herein provide improvements to computing systems configured to manage digital document collections, such as collections of unstructured documents. For example, a topic mapping computing system described herein identifies customized mapping schemas for a digital document collection by applying particular rules that identify relationships among vector data associated with digital documents and topic sets. In some cases, the application of these rules by the topic mapping computing system achieves an improved technological result in, for example, document categorization techniques. For example, by applying the rules, the topic mapping computing system identifies multiple customized mapping schemas for multiple topic sets without expenditure of resources on additional analysis of the digital document collections. In addition, by applying the rules, the topic mapping computing system identifies customized mapping schemas for additional or modified digital document collections without requiring resource-intensive training data, such as large quantities of human-labeled documents.

Additionally or alternatively, the topic mapping computing system generates data objects that describe the identified relationships, such as DTM data objects. In some cases, the DTM data objects could be transmitted to an additional computing system, such as a document mapping curation system configured to provide customized responses to document requests based on the DTM data objects. In addition, the DTM data objects could be relatively compact data objects that can be quickly transmitted among computing systems. In some cases, the generation of the DTM data objects achieves an improved technological result in, for example, computing network performance, such as by providing compact DTM data objects to multiple document curation systems without requiring bandwidth-intensive transmission of documents between the document curation systems and the topic mapping computing system, and without requiring processing-intensive retraining of each of the document curation systems.

Referring now to the drawings, FIG. 1 depicts an example of a computing environment 100 in which customized topics are determined for digital documents. The computing environment 100 includes one or more of a document collection analysis computing system 120, a topic mapping computing system 150, and a document mapping curation computing system 180. In addition, the computing environment 100 includes one or more document repositories, such as a document repository 101. In some cases, the computing environment 100 includes one or more additional computing systems, such as a requesting computing system 190. The requesting computing system 190 includes a user interface 195, by which a user of the requesting computing system 190 may provide or receive data in the computing environment 100.

In FIG. 1, one or more of the document collection analysis computing system 120 or the topic mapping computing system 150 receives one or more collections of digital documents, such as a digital document collection 105 from the document repository 101. In some cases, the digital document collection 105 is a group of multiple digital documents. Additionally or alternatively, the digital document collection 105 includes unstructured digital documents Each digital document in the collection includes or otherwise represents text data, such as word processing documents, website documents, multi-platform documents (e.g., a file having a ".pdf" format), presentation slide files, images that depict text, or other types of data files that can represent text. In some embodiments, the document repository 101 stores one or more high-volume collections of digital documents, such as collections that include thousands (or more) digital documents. For example, the digital document collection 105 can be a high-volume collection that includes multiple thousands of digital documents. In some cases, the document repository 101 stores one or more high-turnover collections of digital documents, such as collections that are modified multiple times per day, or with a higher frequency. For example, the digital document collection 105 can be a high-turnover collection including digital documents that are modified (e.g., added, removed, content updated) at a frequency or at least once per hour. In some cases, the document repository 101 is isolated or semi-isolated from publicly accessible computing networks. For example, the document repository 101 could be a database included in a secured network for an educational or business organization, such that the digital document collection 105 is unavailable for indexing by search engines.

In some embodiments, one or more components in the computing environment 100 analyze data that is included in the digital document collection 105. For example, the document collection analysis computing system 120 is a computing system (or subsystem) that is configured to apply one or more data analysis techniques to the digital document collection 105. The document collection analysis computing system 120 includes one or more subsystems, such as a document parsing module 130 or a vectorization module 140, that are configured for one or more analysis techniques. For example, the document parsing module 130 identifies areas of content within one or more documents in the digital document collection 105, such as by parsing text, performing optical character recognition on images that represent text, or other techniques to identify document content areas. Additionally or alternatively, the vectorization module 140 generates one or more data structures that represent text data from the digital document collection 105, such as structures that include vector data. Example techniques to generate vector data from text data include a term frequency-inverse document frequency model (e.g., "TF-IDF model," "bag-of-word model"), a pre-trained embedding model (e.g., "word2vec model"), a pre-trained language model (e.g., bidirectional encoder representations from transformers, "BERT model"), or any other suitable technique to generate vector data based on text content of a digital document.

In some cases, the document collection analysis computing system 120 performs additional analysis of content that is extracted from the digital document collection 105. For example, the document collection analysis computing system 120 can include one or more modules configured to preprocess text identified by the document parsing module 130. Techniques to preprocess text data include converting text from upper-case to lower-case (or from lower-case to upper-case), tokenization of text phrases into shorter phrases or words, removal of stop-words (e.g., "a," "and," "is"), lemmatization of word or phrase variants (e.g., "happiness" as a variant of "happy"), translation of text between languages, or other techniques for processing text data that is raw (e.g., having various forms) to provide text data having a standardized form. In some cases, the document collection analysis computing system 120 provides preprocessed text data to the vectorization module 140.

In FIG. 1, the topic mapping computing system 150 receives data describing the digital document collection 105. For example, the topic mapping computing system 150 receives, from the document collection analysis computing system 120, vector data describing text that is extracted from each digital document in the collection 105. Additionally or alternatively, the topic mapping computing system 150 receives one or more sets of topics, such as topic sets 110 that include a topic set **110*a* and additional topic sets through a topic set 110*n*. The topic sets 110 are received, for example, from one or more additional computing systems. In some cases, each particular set of the topic sets 110 can be applied to the digital document collection 105 to identify a customized categorization of the digital document collection 105 based on the particular set. For example, the topic set 110*a* is provided by a first additional computing system and the topic set 110*n* is provided by a second additional computing system. In this example, the topic set 110*a* includes a first set of topic labels by which the digital document collection 105 can be categorized, such as a first categorization that is customized for the first additional computing system. In addition, the topic set 110*n* includes a second set of topic labels by which the digital document collection 105 can be categorized, such as a second categorization that is customized for the second additional computing system. The labels in the topic sets 110*a* and 110*n* could include some, all, or no labels that are in common between the sets 110*a* and 110*n***.

In some embodiments, one or more components in the computing environment 100 determines a customized topic mapping of the digital document collection 105. For example, the topic mapping computing system 150 is a computing system (or subsystem) that is configured to determine respective customized topic mappings of the digital document collection 105 based on each topic set in the topic sets 110. The topic mapping computing system 150 includes one or more subsystems, such as a document cluster identification module 160 or a cluster-topic mapping module 170, that are configured to provide data for topic mapping techniques. For example, the document cluster identification module 160 determines one or more clusters in which the digital documents of the collection 105 are grouped. In some cases, the document cluster identification module 160 identifies the document clusters by analyzing respective vector data describing each of the digital documents, such as vector data structures generated by the vectorization module 140. In some embodiments, the document cluster identification module 160 modifies one or more document clusters based on input data from an additional computing system. For example, the document cluster identification module 160 could modify a particular document cluster to include or omit a particular document, responsive to an adjustment input received via the user interface 195 of the requesting computing system 190. Additionally or alternatively, the cluster-topic mapping module 170 generates one or more data objects, such as a DTM data object 155, that describe customized mapping schemas between the topic sets 110 and the digital document collection 105. In some cases, a respective DTM data object is generated for each particular one of the topic sets 110. For example, the DTM data object 155 describes a customized mapping schema between the topic set **110*a* and the digital document collection 105**.

In some cases, the topic mapping computing system 150 can rapidly generate additional DTM data objects for additional topic sets, with improved efficiency for computing resource usage. For example, if the topic mapping computing system 150 receives an additional topic set from an additional computing system, the topic mapping computing system 150 generates an additional DTM data object that describes a customized mapping schema for the additional topic set and the digital document collection 105. Additionally or alternatively, the topic mapping computing system 150 generates the additional DTM data object with minimal or no additional analysis of the digital document collection 105. For example, the topic mapping computing system 150 can generate the additional DTM data object based on vector data structures previously received from the document collection analysis computing system 120, without expenditure of computing resources to generate additional vector data. In some cases, the topic mapping computing system 150 generates the additional DTM data object with minimal or no additional analysis of training data related to the additional topic set. For example, the topic mapping computing system 150 can generate the additional DTM data object without receiving labeled documents as training data, which may reduce the use of computing resources or human efforts for creating or analyzing labeled training documents.

In some cases, the configuration of the computing environment 100 provides various technical improvements in techniques of, for example, document analysis or document-topic mapping. For example, the document collection analysis computing system 120 may be a computing system that is configured for high efficiency in document processing or document analysis. Additionally or alternatively, the topic mapping computing system 150 may be a computing system that is configured for high efficiency in vector data analysis. In this example, the document collection analysis computing system 120 could perform techniques related to document parsing, preprocessing, or vectorization separately from or in parallel with vector data analysis techniques performed by the topic mapping computing system 150. In this example, the topic mapping computing system 150 may generate or modify DTM data objects in response to receiving an additional topic set, without expending computing resources for training or document analysis. Additionally or alternatively, the document collection analysis computing system 120 may generate or modify vector data in response to receiving a modified digital document collection, without disrupting processes that are performed by the topic mapping computing system 150.

In FIG. 1, the document mapping curation computing system 180 is configured to respond to requests from additional computing systems, based on one or more DTM data objects generated by the topic mapping computing system 150. In some cases, a response for a particular computing system includes documents that are categorized according to a DTM data object that is associated with the particular computing system. For example, the document mapping curation computing system 180 receives a request from the requesting computing system 190, such as a request that is based on information input via the user interface 195. The request could indicate, for example, a keyword that is associated with one or more documents from the digital document collection 105. Additionally or alternatively, the keyword could be associated with one or more of the topic sets 110.

Based on the request, the document mapping curation computing system 180 determines that the requesting computing system 190 is associated with the DTM data object 155. For example, the document mapping curation computing system 180 could determine that the requesting computing system 190 provided the topic set 110*a* to the topic mapping computing system 150. Additionally or alternatively, the document mapping curation computing system 180 could determine that the requesting computing system 190 is associated with a particular computing system that provided the topic set 110*a*, such as by identifying in the request a network address, a user login, an administrative privilege, or other information associated with the particular computing system. Responsive to determining that the requesting computing system 190 is associated with the DTM data object 155, the document mapping curation computing system 180 identifies, from the collection 105, a group of digital documents that are categorized according to the DTM data object 155. For example, if the topic set 110*a* includes a particular label with the request keyword, the document mapping curation computing system 180 identifies a group of documents that are mapped to the particular label. The document mapping curation computing system 180 provides the identified group of digital documents to the requesting computing system 190, such as in a response to the request.

In some embodiments, a topic mapping system generates multiple DTM data objects that each respectively describe a customized mapping schema for a respective topic set. Additionally or alternatively, each of the multiple DTM data objects is associated with one or more computing systems, such as a particular computing system that is associated with the respective topic set. In some cases, in response to multiple requests, a document mapping curation system (or subsystem) identifies respective groups of digital documents that are categorized according to respective ones of the multiple DTM data objects. Additionally or alternatively, for each particular request having a particular keyword, the respective identified digital documents can be different from additional documents that are identified for an additional request having the same particular keyword. In response to requests from various requesting computing systems, for example, the document mapping curation system could select documents from customized categories, such as based on customized mapping schemas described by DTM data objects associated with the requesting computing systems.

Figure 2:
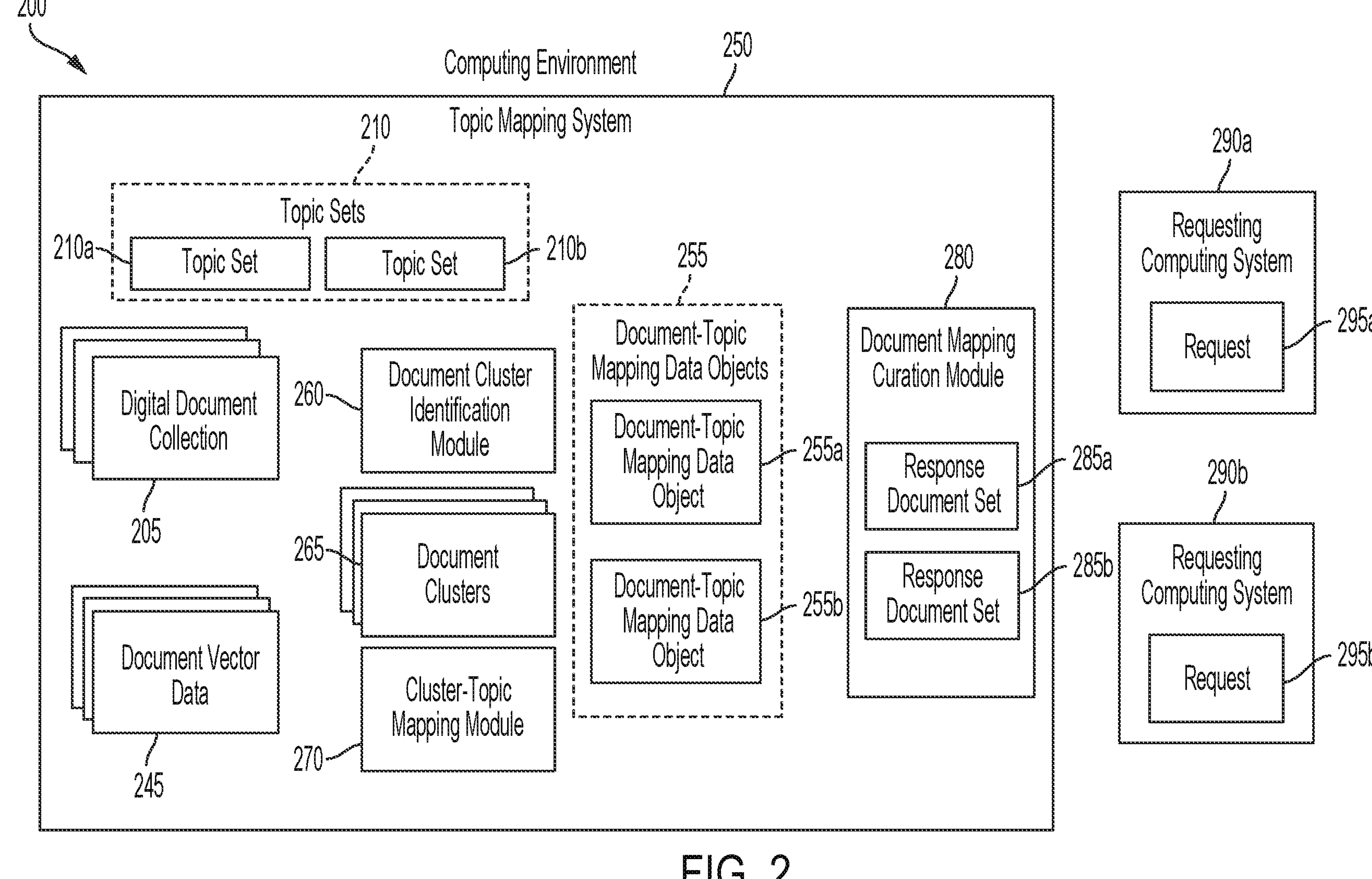
FIG. 2 is a block diagram depicting an example of a computing environment for determining customized topic mapping of digital document collections, according to certain embodiments.

FIG. 2 depicts an example of a computing environment 200 that is configured for determining customized topic mapping of one or more digital document collections. In the computing environment 200, a topic mapping system 250 includes one or more of a document cluster identification module 260, a cluster-topic mapping module 270, or a document mapping curation module 280. In addition, the computing environment 200 includes a requesting computing system 290*a* and a requesting computing system 290*b*. In FIG. 2, the topic mapping system 250 is implemented, for example, via one or more computing systems, such as servers, virtual machines, cloud-based computing resources, or other suitable types of computing systems. In some cases, the topic mapping system 250 is configured to communicate with one or more additional computing systems, such as via a computing network. For example, the topic mapping system 250 is configured to communicate with multiple requesting computing systems, such as the requesting computing systems 290*a* and 290*b*. Additionally or alternatively, the topic mapping system 250 is configured to communicate with a computing system that is configured to apply one or more data analysis techniques to a digital document collection, such as the document collection analysis computing system 120.

In the computing environment 200, the topic mapping system 250 receives one or more of a digital document collection 205 or document vector data 245. In some cases, the digital document collection 205 is a high-volume digital document collection, or a high-turnover digital document collection, or both. Additionally or alternatively, the document vector data 245 includes one or more data structures that represent content extracted from the digital document collection 205. For example, the document vector data 245 includes multiple vector data objects. Each particular vector data object represents particular text data that is extracted from a particular document in the digital document collection 205, such as a respective vector data object for each document in the collection 205. In some cases, the document vector data 245 is based on text data that is parsed, preprocessed, vectorized, or otherwise analyzed by a document collection analysis system, such as the document collection analysis computing system 120 or the document collection analysis system 320. FIG. 2 depicts the topic mapping system 250 as including the digital document collection 205, but other implementations are possible. For example, a topic mapping system could receive document vector data that describes a particular digital document collection without receiving the particular described collection. In this example, the topic mapping system could receive the document vector data from a document collection analysis computing system that is configured to generate the document vector data.

In FIG. 2, the topic mapping system 250 receives one or more topic sets, such as a first topic set 210*a* or a second topic set 210*b* (collectively referred to herein as "topic sets 210"). Each of the topic sets 210 is associated with at least one additional computing system. For example, the topic set 210*a* is associated with the requesting computing system 290*a*. The topic set 210*b* is associated with the requesting computing system 290*b*. In some cases, the topic mapping system 250 determines an association between a topic set and a computing system based on a source of the topic set. For instance, the topic mapping system 250 can determine the association between a particular topic set and a particular computing system in response to receiving the particular topic set from the particular computing system. Additionally or alternatively, the topic mapping system 250 determines an association between a topic set and a computing system based on additional information received from a computing system. For instance, a computing system that provides a particular topic set could provide information indicating additional computing systems that are associated with the particular topic set, such as information indicating computing system characteristics. Examples of computing system characteristics associated with a particular topic set could include a network domain, a network address (e.g., IP address), user login information, user privileges (e.g., administrative permissions), user account information, or other characteristics of computing systems.

As an example, the topic mapping system 250 could receive the topic sets 210 from an additional computing system that is associated with, for instance, an educational institution. In this example, the additional computing system can provide data describing characteristics of computing systems that are associated with respective ones of the topic sets 210. For instance, the additional computing system could indicate that the topic set 210*a* is associated with characteristics of computing systems used by information technology ("IT") staff of the educational institution. In addition, the additional computing system could indicate that the topic set 210*b* is associated with characteristics of computing systems used by students of the educational institution. In this example, the topic mapping system 250 can determine the association between the topic set 210*a* and the requesting computing system 290*a* in response to receiving, e.g., from the system 290*a*, computing characteristics associated with the topic set 210*a*, such as login information for an IT specialist or a network address of a computing system included in the IT staff office. In addition, the topic mapping system 250 can determine the association between the topic set 210*b* and the requesting computing system 290*b* in response to receiving, e.g., from the system 290*b*, computing characteristics associated with the topic set 210*b*, such as login information for a student or a network address of a computing system included in a classroom.

Based on one or more of the document vector data 245 or the topic sets 210, the topic mapping system 250 determines one or more groups of document clusters, such as document clusters 265. In the computing environment 200, the document cluster identification module 260 generates the document clusters 265 by applying at least one clustering technique to the document vector data 245. For example, the document cluster identification module 260 analyzes each vector data object in the document vector data 245 based on a k-means clustering technique, but other suitable clustering techniques may be used. In some cases, the document cluster identification module 260 calculates respective vector similarity values between one or more pairs of the vector data objects in the document vector data 245. For each pair of the vector data objects, for instance, a respective vector similarity value indicates a similarity (e.g., a cosine similarity) between data in the vector data objects. For example, a vector similarity value could be calculated between a first vector data object for a first digital document and a second vector data object for a second digital document. Additionally or alternatively, the document cluster identification module 260 generates the document clusters 265 using relationships among the vector data objects in the document vector data 245, such as the vector similarity values or other relationships identified via the example k-means clustering technique.

In some cases, each document cluster in the document clusters 265 indicates a group of digital documents that have similar content, such as content similarity that is identified via the clustering technique applied by the document cluster identification module 260. Additionally or alternatively, the document cluster identification module 260 identifies one or more content terms for the document clusters 265. For example, the document cluster identification module 260 could identify that document vector data for a particular document cluster includes a high frequency of particular words or phrases. The particular words or phrases could be identified as content terms for the particular document cluster. As an example, if document vector data for the particular document cluster includes the example terms "network security," "password strength," or "firewall" that occur with relatively high frequency (e.g., compared to occurrences of other terms) the document cluster identification module 260 may identify "network security," "password strength," or "firewall" as content terms for the particular document cluster, such as content terms that indicate subject matter of the documents in the particular cluster.

In some cases, the topic mapping system 250 determines a group of document clusters for multiple topic sets, such as a particular group of document clusters that is mapped to multiple topic sets. Additionally or alternatively, the topic mapping system 250 determines a particular group of document clusters for a particular topic set. For example, the document cluster identification module 260 determines a first group of document clusters for the topic set 210*a*, such that the first cluster set includes a quantity of document clusters based on a quantity of topic labels included in the topic set 210*a*. If, for instance, the topic set 210*a* includes twenty labels, the first cluster set could include twenty document clusters. Additionally or alternatively the document cluster identification module 260 determines a second group of document clusters for the topic set 210*b*, such that the second cluster set includes a quantity of document clusters based on a quantity of topic labels included in the topic set 210*b*, such as a quantity of twenty-five labels corresponding to a quantity of twenty-five document clusters.

In some embodiments, the document clusters 265 are modified based on information received from an additional computing system. For example, if the topic mapping system 250 receives the topic sets 210 from an additional computing system, data indicating the document clusters 265 could be provided to the additional computing system. The topic mapping system 250 can provide, for instance, visualization data describing the document clusters 265 that can be displayed via a user interface device of the additional computing system. In some cases, the document clusters 265 are described by data describing a t-distributed stochastic neighbor embedding ("T-SNE") visualization technique, but other suitable visualization techniques may be used. In this example, the topic mapping system 250 receives, from the additional computing system, data indicating a modification to the document clusters 265, such as a user input indicating a cluster modification for a particular document. In response to the received data, the document cluster identification module 260 can perform the indicated modification to the document clusters 265, such as removing the particular document from a first cluster and including the particular document in a second cluster.

In FIG. 2, the topic mapping system 250 generates one or more DTM data objects that describe customized mapping schemas between the topic sets 210 and the document clusters 265. In some cases, each of the DTM data objects is associated with a particular topic set. Additionally or alternatively, each of the DTM data objects is associated with a particular computing system or particular computing system characteristics, such as a computing system or characteristics associated with the particular topic set. In some cases, the cluster-topic mapping module 270 generates one or more DTM data objects by applying at least one mapping technique to the document clusters 265. For example, the cluster-topic mapping module 270 identifies relationships between labels in a particular topic set and content terms in a particular document cluster. Examples of mapping techniques include determining a Jaccard distance, a Pearson correlation, or a cosine similarity, but other suitable mapping techniques may be used. In some cases, the cluster-topic mapping module 270 calculates respective cluster similarity values between one or more pairs of a document cluster from the clusters 265 and a topic set from the topic sets 210. For each pair of a particular document cluster and particular topic set, for instance, a respective cluster similarity value indicates a relationship (e.g., a Jaccard distance) between data in the particular document cluster and the particular topic set. For example, a cluster similarity value could be calculated between content terms from the particular document cluster and topics labels from the particular topic set. In some cases, the cluster-topic mapping module 270 identifies a mapping between a particular document cluster and a particular label from the topic set, such as a one-to-one mapping between document clusters and topic labels. Additionally or alternatively, the cluster-topic mapping module 270 identifies a mapping between a particular document cluster and multiple labels from the topic set, such as a one-to-many mapping between document clusters and topic labels.

In the computing environment 200, the cluster-topic mapping module 270 generates, at least, a DTM data object 255*a* and a DTM data object 255*b* (collectively referred to herein as the DTM data objects 255). The DTM data object 255*a* is associated with the topic set 210*a* and the DTM data object 255*b* is associated with the topic set 210*b*. In some cases, the DTM data object 255*a* describes a first customized mapping schema between topic labels included in the topic set 210*a* and the document clusters 265 (or the first cluster set from the clusters 265). Additionally or alternatively, the DTM data object 255*b* describes a second customized mapping schema between topic labels included in the topic set 210*b* and the document clusters 265 (or the second cluster set from the clusters 265). In some cases, the DTM data object 255*a* is associated with the requesting computing system 290*a* (or one or more computing system characteristics thereof) and the DTM data object 255*b* is associated with the requesting computing system 290*b* (or one or more computing system characteristics thereof).

Continuing with the example content terms of "network security," "password strength," and "login," the DTM data object 255*a* could describe a customized mapping between a label "network configuration" and a first document cluster, from the first cluster set, that corresponds to these content terms. In addition, the DTM data object 255*b* could describe a customized mapping between a label "new student setup" and a second document cluster, from the second cluster set, that corresponds to these content terms. In this example, document clusters that have same or similar document content, such as content indicated by content terms, may have customized mappings to various topic labels from various topic sets, such as topic sets associated with the example computing systems used by IT staff or by students.

In FIG. 2, the topic mapping system 250 generates one or more responses to requests from at least one additional computing system. The responses are generated based on, for example, the DTM data objects 255. For example, the document mapping curation module 280 receives a request 295*a* and a request 295*b*. The request 295*a* is received from the requesting computing system 290*a*, for example, and the request 295*b* is received from the requesting computing system 290*b*. In some cases, each of the requests 295*a* and 295*b* includes at least one keyword. Additionally or alternatively, each of the requests 295*a* and 295*b* indicates a respective computing system from which the request is received, such as the requesting computing systems 290*a* and 290*b*. For example, the request 295*a* includes data describing characteristics of the requesting computing system 290*a*, such as login information for an IT specialist who uses the system 290*a*. In addition, the request 295*b* includes data describing characteristics of the requesting computing system 290*b*, such as login information for a student who uses the system 290*b*.

Based on data included in the request 295*a*, the document mapping curation module 280 determines that the requesting computing system 290*a* is associated with one or more of the DTM data object 255*a* or the topic set 210*a*. Responsive to determining the association of the requesting computing system 290*a*, the document mapping curation module 280 identifies one or more documents that are categorized according to the DTM data object 255*a*. For example, the document mapping curation module 280 determines that a first keyword in the request 295*a* is mapped, via the customized mapping schema in the DTM data object 255*a*, to a first group of documents from the digital document collection 205. In some cases, the document mapping curation module 280 generates a response document set 285*a* that includes, or otherwise indicates, the first group of documents. The response document set 285*a* is provided to the requesting computing system 290*a*, for example, by the topic mapping system 250.

Additionally or alternatively, based on data included in the request 295*b*, the document mapping curation module 280 determines that the requesting computing system 290*b* is associated with one or more of the DTM data object 255*b* or the topic set 210*b*. Responsive to determining the association of the requesting computing system 290*b*, the document mapping curation module 280 identifies one or more documents that are categorized according to the DTM data object 255*b*. For example, the document mapping curation module 280 determines that a second keyword in the request 295*b* is mapped, via the customized mapping schema in the DTM data object 255*b*, to a second group of documents from the digital document collection 205. In some cases, the document mapping curation module 280 generates a response document set 285*b* that includes, or otherwise indicates, the second group of documents. The response document set 285*b* is provided to the requesting computing system 290*b*, for example, by the topic mapping system 250.

In some embodiments, the first keyword and the second keyword included in the requests 295*a* and 295*b* are a same keyword, or substantially similar. Additionally or alternatively, the first group of documents and the second group of documents identified by the document mapping curation module 280 include different documents, e.g., some or all of the documents in the response document set 285*a* are different from some or all of the documents in the response document set 285*b*. For example, each of the requests 295*a* and 295*b* can include a particular keyword "network setup." Based on characteristics indicated by the request 295*a*, e.g., characteristics of computing systems used by IT staff, the document mapping curation module 280 determines that the request 295*a* is received from the computing system 290*a*, which is associated with the DTM data object 255*a*. The document mapping curation module 280 generates the response document set 285*a* based on the mapping described by the DTM data object 255*a*, such as by selecting documents that describe network architecture security, firewall configuration, or other documents with content that is suitable for an IT specialist. In addition, based on characteristics indicated by the request 295*b*, e.g., characteristics of computing systems used by students, the document mapping curation module 280 determines that the request 295*b* is received from the computing system 290*b*, which is associated with the DTM data object 255*b*. The document mapping curation module 280 generates the response document set 285*b* based on the mapping described by the DTM data object 255*b*, such as by selecting documents that describe student login information, dormitory network requirements, or other documents with content that is suitable for a student. In this example, the document mapping curation module 280 generates response document sets with different documents in response to receiving requests with a same keyword "network setup," based in part on the customized mapping schemas described by the DTM data objects 255*a* and 255*b*.

In some embodiments, a topic mapping system, such as the topic mapping system 250, receives vector data from a document collection analysis system, such as document vector data describing a digital document collection that is high-volume or high-turnover (or both). The document collection analysis system can be configured for high-efficiency analysis of digital documents. In some cases, the document collection analysis system is configured to provide updated document vector data to the topic mapping system, such as in response to receiving a modified digital document collection.

Figure 3:
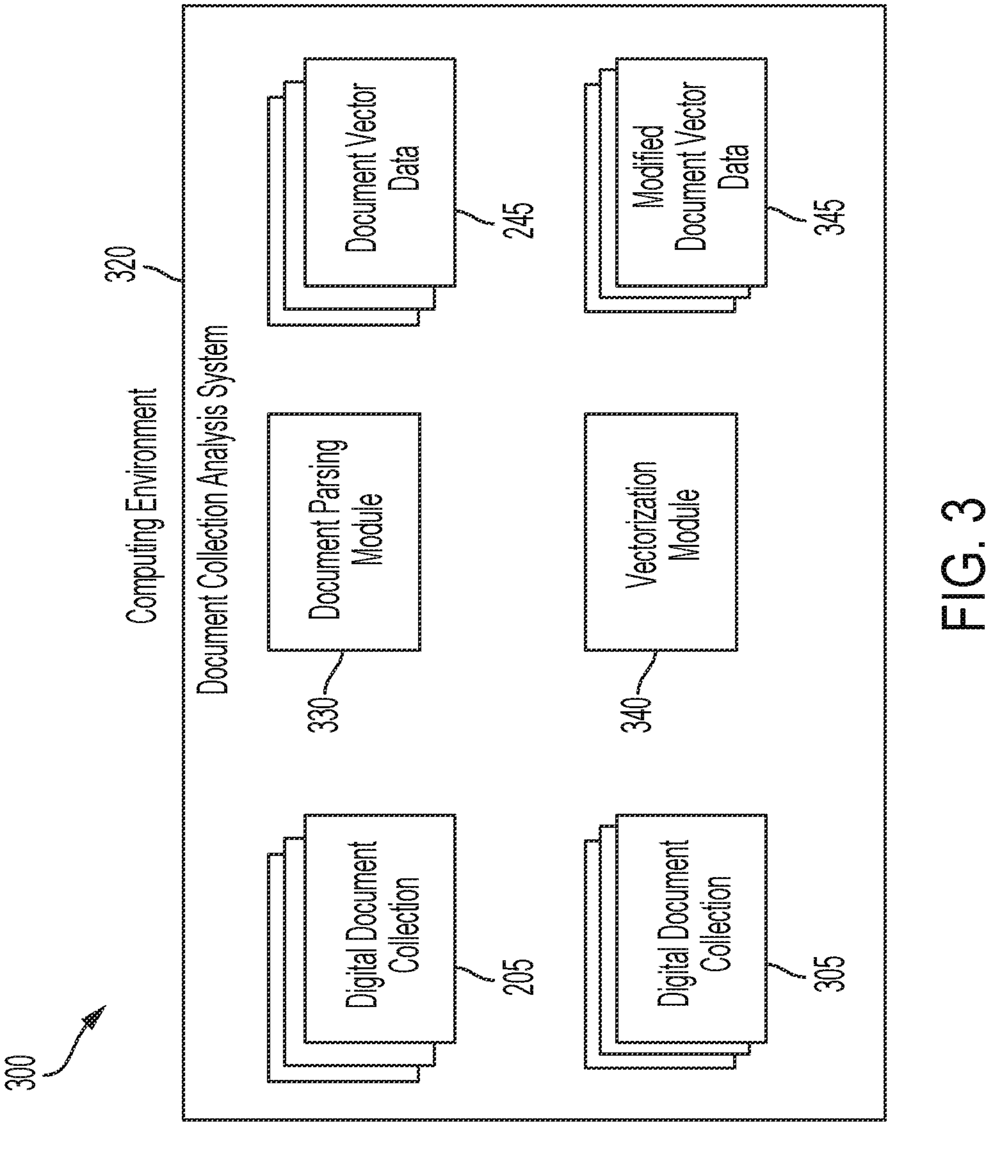
FIG. 3 is a block diagram depicting an example of a computing environment for generating vector data for high-volume, high-turnover digital document collections, according to certain embodiments.

FIG. 3 depicts an example of a computing environment 300 that is configured for generating vector data for one or more digital document collections that are high-volume, high-turnover, or both. In the computing environment 300, a document collection analysis system 320 includes one or more of a document parsing module 330 or a vectorization module 340. In FIG. 3, the document collection analysis system 320 is implemented, for example, via one or more computing systems, such as servers, virtual machines, cloud-based computing resources, or other suitable types of computing systems. In some cases, the document collection analysis system 320 is configured to communicate with one or more additional computing systems, such as via a computing network. For example, the document collection analysis system 320 is configured to communicate with one or more topic mapping systems, such and the topic mapping system 250. Additionally or alternatively, the document collection analysis system 320 is configured to communicate with one or more data repositories, such as the document repository 101.

In the computing environment 300, the document collection analysis system 320 receives one or more digital document collections, such as digital document collections that are high-volume, high-turnover, or both. For example, the document collection analysis system 320 receives the digital document collection 205 described in regards to FIG. 2. Additionally or alternatively, the document collection analysis system 320 generates the document vector data 245 based on the digital document collection 205. For example, the document parsing module 330 identifies areas of text content in the digital documents of the collection 205. In addition, the vectorization module 340 generates the document vector data 245. For example, the vectorization module 340 generates a vector data object for each digital document in the collection 205, such that each vector data object represents text data from a particular digital document. In some cases, the document collection analysis system 320 (or a subsystem) performs additional analysis of data that is extracted from digital document collection 205, such as via additional modules configured for tokenization, lemmatization, or other suitable techniques for processing text data. The vectorization module 340 could generate the document vector data 245, for example, based on parsed text data that modified via one or more preprocessing techniques.

In some embodiments, the document collection analysis system 320 provides the document vector data 245 to, for example, the topic mapping system 250 described in regards to FIG. 2. In FIG. 3, the document collection analysis system 320 receives one or more modifications to the digital document collection 205. Examples of modifications to the digital document collection 205 include receiving one or more additional digital documents, removal of one or more digital documents, or updating content included in one or more digital documents. For example, the document collection analysis system 320 receives an additional digital document collection 305. In some cases, the digital document collection 305 is a high-volume digital document collection, or a high-turnover digital document collection, or both.

Responsive to receiving the additional digital document collection 305 (or other modifications to the collection 205), the document collection analysis system 320 generates modified document vector data 345. For example, the document parsing module 330 identifies areas of text content in the digital documents of the collection 305 or modified documents of the collection 205. In some cases, the document collection analysis system 320 (or a subsystem) performs additional analysis of data that is extracted from digital document collection 305 or modified documents of the collection 205. Additionally or alternatively, the vectorization module 340 generates the modified document vector data 345, including respective vector data objects for each digital document in the collection 305. In some cases, the vectorization module 340 modifies a vector data object associated with a modified document of the collection 205, such as to represent updated text data from the modified document. Additionally or alternatively, the vectorization module 340 removes one or more vector data objects from the modified document vector data 345, such as a particular vector data object associated with a removed digital document.

In FIG. 3, the document collection analysis system 320 provides the modified document vector data 345 to one or more topic mapping systems, such as the topic mapping system 250. In some cases, the topic mapping system 250 identifies document clusters from the additional digital document collection 305, or from a combination of the collections 205 and 305, based on the modified document vector data 345. Additionally or alternatively, the topic mapping system 250 generates one or more additional DTM data objects based on the modified document vector data 345, such as by mapping one or more of the topic sets 210 to the additional digital document collection 305, or the combination of the collections 205 and 305. In some cases, the topic mapping system 250 generates the additional DTM data objects based on the modified document vector data 345, without expending computing resources on re-training.

Figure 4:
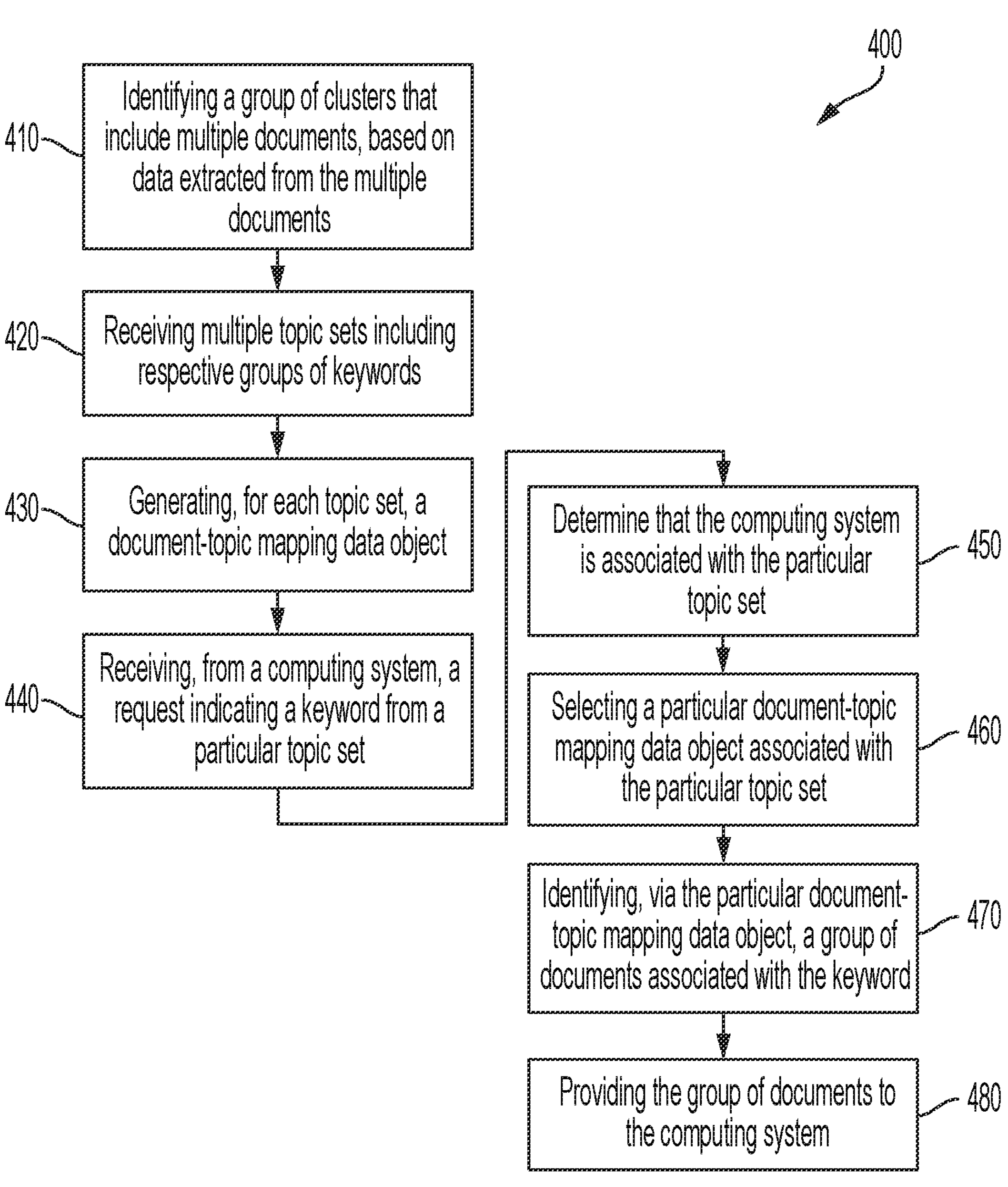
FIG. 4 is a flow chart depicting an example of a process for determining customized topic mappings for a digital document collection, according to certain embodiments.

FIG. 4 is a flow chart depicting an example of a process 400 for determining one or more customized topic mappings for a digital document collection. In some embodiments, such as described in regards to FIGS. 1-3, a computing device executing a topic mapping system implements operations described in FIG. 4, by executing suitable program code. For illustrative purposes, the process 400 is described with reference to the examples depicted in FIGS. 1-3. Other implementations, however, are possible.

At block 410, the process 400 involves identifying, such as by a topic mapping system, a group of document clusters that include multiple documents. In some cases, a document cluster identification module included in the topic mapping system identifies the group of document clusters. For example, the document cluster identification module receives text data that is extracted from the multiple documents, such as document vector data generated by a document collection analysis system. In some cases, the multiple documents are included in a digital document collection is received by a document collection analysis system, such as a digital document collection that is one or more of high-volume or high-turnover. For example, the topic mapping system 250 receives the document vector data 245, such as from the document collection analysis system 320. Based on the document vector data 245, the document cluster identification module 260 identifies one or more groups of document clusters, such as the document clusters 265.

In some cases, the group of document clusters is identified based on a comparison of data extracted from respective ones of the multiple documents. For example, a first set of text data extracted from a first document is compared to a second set of text data extracted from a second document. The document cluster identification module 260, for example, calculates one or more vector similarity values between respective pairs of vector data objects in the document vector data 245, such as a vector similarity value between a first vector data object representing first text data from a first document and a second vector data object representing second text data from a second document. In some cases, identifying the group of document clusters is based on the vector similarity values, such as by generating a cluster that includes documents with relatively high vector similarity values.

At block 420, the process 400 involves receiving one or more topic sets, such as multiple topic sets that are received by the topic mapping system. In some cases, each of the topic sets includes a respective group of topic labels. The topic sets are received, for instance, by a cluster-topic mapping module included in the topic mapping system. For example, the cluster-topic mapping module 270 receives the topic sets 210. In some cases, the topic set **210*a* includes a first group of topic labels, such as labels related to areas of interest for IT staff, and the topic set 210*b*** includes a second group of topic labels, such as labels related to areas of interest for students.

At block 430, the process 400 involves generating one or more DTM data objects, such as a DTM data object that associates a topic set and a document cluster. In some cases, the cluster-topic mapping module generates a particular DTM data object for a particular topic set. Additionally or alternatively, each particular DTM data object describes a customized mapping schema between a particular topic set and a particular document cluster. For example, the cluster-topic mapping module 270 generates the DTM data objects **255*a* and 255*b* for the respective topic sets 210*a* and 210*b*. Each of the DTM data objects 255*a* and 255*b* describes a respective customized mapping schema of a group of clusters from the document clusters 265 with the topic sets 210*a* and 210*b***.

In some cases, the one or more DTM data objects are generated identified based on data from a topic set and a document cluster. For example, one or more topic labels from a particular topic set are compared to one or more content terms from a particular document cluster. The cluster-topic mapping module 270, for example, calculates one or more cluster similarity values between pairs of a document cluster from the clusters 265 and a topic set from the topic sets 210, such as a cluster similarity value between content terms from a particular document cluster and topic labels from a particular topic set. In some cases, generating the DTM data objects is based on the cluster similarity values, such as by generating a DTM data object that maps particular topic labels to particular content terms with relatively high cluster similarity values.

At block 440, the process 400 involves receiving one or more requests, such as a request received from a requesting computing system. For example, a document mapping curation system included in (or otherwise in communication with) the topic mapping system receives the one or more requests from one or more requesting computing systems. In some cases, the request includes (or otherwise indicates) a keyword. Additionally or alternatively, the keyword is associated with one or more of the topic sets. For example, the document mapping curation module 280 receives the requests 295*a* and 295*b* from the requesting computing systems 290*a* and 290*b*. Each of the requests 295*a* and 295*b* includes, for instance, a keyword that is associated with one or more of the topic sets 210. For example, if each of the requests 295*a* and 295*b* includes a particular keyword "network setup," the keyword "network setup" may be associated with one or more of the topic sets 210.

At block 450, the process 400 involves determining that the requesting computing system is associated with a particular topic set indicated by the request. For example, the document mapping curation system determines that the request includes at least one computing system characteristic of the requesting computing system. Additionally or alternatively, the document mapping curation system determines that the requesting computing system is associated with a first topic set from the one or more topic sets, such as by determining that the computing system characteristic is indicated by the first topic set. For example, the document mapping curation module 280 determines that the request 295*a* includes a characteristic of a computing system used by IT staff. In addition, the document mapping curation module 280 determines that the topic set 210*a* is associated with characteristics of computing systems used by IT staff. Responsive to determining the characteristic in the request 295*a* is included in (or within a threshold similarity to) the characteristics indicated by the topic set 210*a*, the document mapping curation module 280 determines that the requesting computing system 290*a* is associated with the topic set 210*a*.

At block 460, the process 400 involves selecting a particular DTM data object associated with the particular topic set indicated by the request. For example, the document mapping curation system determines that the first topic set is associated with a first DTM data object. Responsive to determining that the first topic set is associated with the first DTM data object, the document mapping curation system selects the first DTM data object. In some cases, the document mapping curation system selects the first DTM data object to generate a customized response to the request. For example, the document mapping curation module 280 selects the DTM data object 255*a*, such as in response to determining that the DTM data object 255*a* is associated with the topic set 210*a*. Additionally or alternatively, the document mapping curation module 280 determines that the DTM data object 255*a* is applicable to one or more of the request 295*a* or the requesting computing system 290*a*.

At block 470, the process 400 involves identifying a group of documents that are associated with the keyword indicated by the request. The documents are identified, for example, from the multiple documents described by the document clusters. In some cases, the document mapping curation system identifies the documents based on the particular DTM data object selected in regards to block 460, such as by applying the customized mapping schema described by the particular DTM data object to the multiple documents. For example, the document mapping curation module 280 generates the response document set 285*a* by identifying documents that are categorized according to the DTM data object 255*a*, such as categorized documents that are associated with the keyword from the request 295*a*.

At block 480, the process 400 involves providing the group of documents to the requesting computing system. In some cases, the document mapping curation system generates a response to the request, such that the response includes (or otherwise indicates) the identified group of documents. Additionally or alternatively, the document mapping curation system provides the response to the requesting computing system. For example, the document mapping curation module 280 generates the response document set 285*a* that identifies one or more documents categorized according to the DTM data object 255*a*. In some cases, the document mapping curation module 280 provides the response set 285*a* to the requesting computing system 290*a*, in response to the request 295*a*.

In some cases, the example topic mapping system described in regards to the process 400 receives multiple requests from multiple requesting computing systems. The multiple requests may include a particular keyword, such as a same keyword included in each of the requests. In response to determining that the multiple requests are associated with multiple DTM data objects, the topic mapping system generates customized responses that include respective groups of documents selected based on respective ones of the multiple DTM data objects. The respective groups of documents can include different documents to the multiple requesting computing systems based on mapping the particular keyword to the documents via the customized mapping schemas represented by the DTM data objects. Additionally or alternatively, the topic mapping system provides the customized responses to the respective requesting computing systems, such as in response to the request having the same particular keyword. For example, the document mapping curation module 280 generates the response document set 285*a* based on the mapping described by the DTM data object 255*a* and the response document set 285*b* based on the mapping described by the DTM data object 255*b*. The response document sets 285*a* and 285*b* can include different documents in response to receiving the requests 295*a* and 295*b* with a same keyword, based in part on the customized mapping schemas described by the DTM data objects 255*a* and 255*b*. Additionally or alternatively, the document mapping curation module 280 provides the response document sets 285*a* and 285*b* to, respectively, the requesting computing systems 290*a* and 290*b*.

Figure 5:
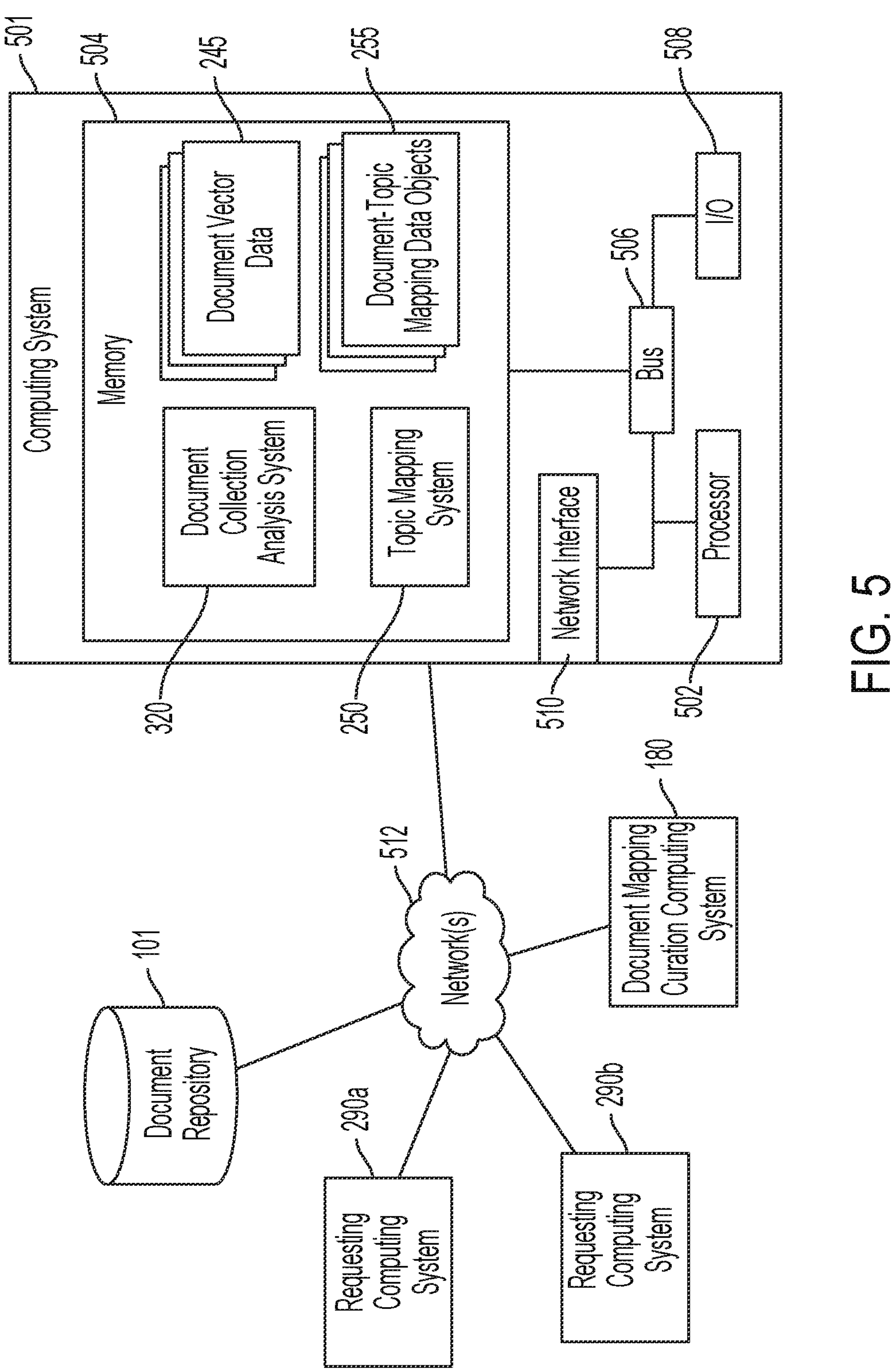
FIG. 5 is a block diagram depicting an example of a computing system for implementing a topic mapping system, according to certain embodiments.

Any suitable computing system or group of computing systems can be used for performing the operations described herein. For example, FIG. 5 is a diagram depicting an example of a computing system configured for determining a customized topic mapping of a digital document collection, according to certain embodiments.

The depicted example of a computing system 501 includes one or more processors 502 communicatively coupled to one or more memory devices 504. The processor 502 executes computer-executable program code or accesses information stored in the memory device 504. Examples of processor 502 include a microprocessor, an application-specific integrated circuit ("ASIC"), a field-programmable gate array ("FPGA"), or other suitable processing device. The processor 502 can include any number of processing devices, including one.

The memory device 504 includes any suitable non-transitory computer-readable medium for storing the document collection analysis system 320, the topic mapping system 250, the document vector data 245, the DTM data objects 255, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 501 may also include a number of external or internal devices such as input or output devices. For example, the computing system 501 is shown with an input/output ("I/O") interface 508 that can receive input from input devices or provide output to output devices. A bus 506 can also be included in the computing system 501. The bus 506 can communicatively couple one or more components of the computing system 501.

The computing system 501 executes program code that configures the processor 502 to perform one or more of the operations described above with respect to FIGS. 1-4. The program code includes operations related to, for example, one or more of the document collection analysis system 320, the topic mapping system 250, the document vector data 245, the DTM data objects 255, or other suitable applications or memory structures that perform one or more operations described herein. The program code may be resident in the memory device 504 or any suitable computer-readable medium and may be executed by the processor 502 or any other suitable processor. In some embodiments, the document collection analysis system 320, the topic mapping system 250, the document vector data 245, and the DTM data objects 255 are stored in the memory device 504, as depicted in FIG. 5. In additional or alternative embodiments, one or more of the document collection analysis system 320, the topic mapping system 250, the document vector data 245, the DTM data objects 255, and the program code described above are stored in one or more memory devices accessible via a data network, such as a memory device accessible via a cloud service.

The computing system 501 depicted in FIG. 5 also includes at least one network interface 510. The network interface 510 includes any device or group of devices suitable for establishing a wired or wireless data connection to one or more data networks 512. Non-limiting examples of the network interface 510 include an Ethernet network adapter, a modem, and/or the like. The computing system 501 is able to communicate with one or more of the document repository 101, the document mapping curation computing system 180, or the requesting computing systems 290*a* or 290*b* using the network interface 510. Although FIG. 5 depicts the document mapping curation computing system 180 as connected to computing system 501 via the networks 512, other embodiments are possible, including a document mapping curation system running as a program in the memory 504 of computing system 501. In some embodiments, the document collection analysis system 320 may be implemented via an additional computing system, such as an additional computing system able to communicate with the computing system 501 via the networks 512.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A system for generating a customized data mapping for a digital document collection, the system comprising:

a processing device; and a memory device in which instructions executable by the processing device are stored for causing the processing device to perform operations implementing:

a document cluster identification module configured for:

receiving text data extracted from multiple documents in a digital document collection; and identifying a group of clusters that includes the multiple documents, in which each cluster is identified based on (i) a first set of text data extracted from a first document of the multiple documents and (ii) a second set of text data extracted from a second document of the multiple documents, a cluster-topic mapping module configured for:

receiving multiple topic sets, each topic set of the multiple topic sets including a respective group of topic labels;

generating a first document-topic mapping data object ("DTM data object") for a first topic set from the multiple topic sets, wherein the first DTM data object represents a first mapping schema that associates a particular cluster from the group of clusters with a first topic label from the first topic set; and generating a second DTM data object for a second topic set from the multiple topic sets, wherein the second DTM data object represents a second mapping schema that associates the particular cluster from the group of clusters with a second topic label from the second topic set, and a document mapping curation module configured for:

receiving a request from a requesting computing system, the request indicating a keyword that corresponds to the first topic set and the second topic set;

determining that the requesting computing system is associated with the first topic set;

responsive to determining that the requesting computing system is associated with the first topic set:

i) selecting the first DTM data object, ii) identifying that the first mapping schema of the first DTM data object associates a group of documents with the keyword corresponding to the first topic set, and iii) generating a response document set that includes the group of documents associated with the keyword via the first mapping schema of the first DTM data object and omits an additional group of documents associated with the keyword via the second mapping schema of the second DTM data object; and providing, to the requesting computing system, the response document set including the group of documents and omitting the additional group of documents.

2. The system of claim 1, wherein the group of documents included in the response document set are included in the particular cluster from the group of clusters, and the additional group of documents omitted from the response document set are included in an additional cluster from the group of clusters, wherein the particular cluster is associated with the keyword via the first mapping schema and the additional cluster is associated with the keyword via the second mapping schema.

3. The system of claim 1, the document mapping curation module further configured for:

receiving an additional request from an additional requesting computing system, the additional request indicating the keyword;

determining that the additional requesting computing system is associated with the second topic set;

responsive to determining that the additional requesting computing system is associated with the second topic set:

iv) selecting the second DTM data object, and v) identifying that the second mapping schema of the second DTM data object associates the additional group of documents with the keyword corresponding to the second topic set; and providing, to the additional requesting computing system, an additional response document set.

4. The system of claim 3, wherein the additional response document set omits the group of documents associated with the keyword via the first mapping schema of the first DTM data object and includes the additional group of documents associated with the keyword via the second mapping schema of the second DTM data object.

5. The system of claim 1, in which the instructions executable by the processing device are further for causing the processing device to perform additional operations implementing:

a content vectorization module configured for:

generating, for each particular document in the multiple documents, a respective vector data object describing respective text data extracted from the particular document, wherein the first set of text data extracted from the first document is a first vector data object describing the text data of the first document.

6. The system of claim 5, the document cluster identification module further configured for:

calculating respective vector similarity values between (i) the first vector data object describing the text data of the first document and (ii) each respective vector data object describing the respective text data of the each particular document, wherein identifying the group of clusters that includes the multiple documents is further based on the respective vector similarity values.

7. The system of claim 1, the cluster-topic mapping module further configured for:

calculating, for each cluster, a cluster similarity value between (i) a content term from the first set of text data and (ii) the first topic label from the first topic set, wherein generating the first DTM data object is based on the cluster similarity value.

8. A non-transitory computer-readable medium embodying program code for generating a customized data mapping for a digital document collection, the program code comprising instructions which, when executed by a processor, cause the processor to perform operations comprising:

identifying a group of clusters that includes multiple documents in a digital document collection, in which each cluster is identified based on (i) a first set of data extracted from a first document of the multiple documents and (ii) a second set of data extracted from a second document of the multiple documents;

receiving multiple topic sets, each topic set of the multiple topic sets including a respective group of topic labels;

generating, for each respective topic set of the multiple topic sets, a respective document-topic mapping data object ("DTM data object"), wherein each respective DTM data object represents a respective mapping schema that associates a particular cluster from the group of clusters with a particular topic label from the respective topic set;

receiving a request from a requesting computing system, the request indicating a keyword that corresponds to a first topic set and a second topic set;

responsive to determining that the requesting computing system is associated with the first topic set:

i) selecting a first DTM data object that is associated with the first topic set, wherein the first DTM data object represents a first mapping schema that associates a particular cluster from the group of clusters with a first topic label from the first topic set, ii) identifying that the first mapping schema of the first DTM data object associates a group of documents with the keyword corresponding to the first topic set, and iii) generating a response document set that includes the group of documents associated with the keyword via the first mapping schema of the first DTM data object and omits an additional group of documents associated with the keyword via a second mapping schema of represented by a second DTM data object, wherein the second mapping schema associates the particular cluster from the group of clusters with a second topic label from the second topic set; and providing, to the requesting computing system, the response document set including the group of documents and omitting the additional group of documents.

9. The non-transitory computer-readable medium of claim 8, wherein the group of documents included in the response document set are included in the particular cluster from the group of clusters, and the additional group of documents omitted from the response document set are included in an additional cluster of the group of clusters, wherein the particular cluster is associated with the keyword via the first mapping schema and the additional cluster is associated with the keyword via the second mapping schema.

10. The non-transitory computer-readable medium of claim 8, the instructions causing the processor to perform further operations comprising:

receiving an additional request from an additional requesting computing system, the additional request indicating the keyword;

determining that the additional requesting computing system is associated with the second topic set;

responsive to determining that the additional requesting computing system is associated with the second topic set:

iv) selecting the second DTM data object that is associated with the second topic set, and v) identifying that the second mapping schema of the second DTM data object associates the additional group of documents with the keyword corresponding to the second topic set; and providing, to the additional requesting computing system, an additional response document set, wherein the additional response document set omits the group of documents associated with the keyword via the first mapping schema of the first DTM data object and includes the additional group of documents associated with the keyword via the second mapping schema of the second DTM data object.

11. The non-transitory computer-readable medium of claim 8, the instructions causing the processor to perform further operations comprising:

generating, for each particular document in the multiple documents, a respective vector data object describing respective data extracted from the particular document, wherein the first set of data extracted from the first document is a first vector data object describing the data of the first document.

12. The non-transitory computer-readable medium of claim 11, the instructions causing the processor to perform further operations comprising:

calculating respective vector similarity values between (i) the first vector data object describing the data of the first document and (ii) each respective vector data object describing the respective data extracted from the each particular document, wherein identifying the group of clusters that includes the multiple documents is further based on the respective vector similarity values.

13. The non-transitory computer-readable medium of claim 8, the instructions causing the processor to perform further operations comprising:

calculating, for each cluster, a cluster similarity value between (i) a content term from the first set of data and (ii) the first topic label from the first topic set, wherein generating the first DTM data object is based on the cluster similarity value.

14. A method of generating a customized data mapping for a document digital collection, the method including instructions that, when implemented via one or more processing devices, perform operations comprising:

identifying a group of clusters that includes multiple documents in a digital document collection, in which each cluster is identified based on (i) a first set of data extracted from a first document of the multiple documents and (ii) a second set of data extracted from a second document of the multiple documents;

receiving multiple topic sets, each topic set of the multiple topic sets including a respective group of topic labels;

generating, for each respective topic set of the multiple topic sets, a respective document-topic mapping data object ("DTM data object"), wherein each respective DTM data object represents a respective mapping schema that associates a particular cluster from the group of clusters with a particular topic from the respective topic set;

receiving a request from a requesting computing system, the request indicating a keyword that corresponds to a first topic set and a second topic set;

responsive to determining that the requesting computing system is associated with the first topic set:

i) selecting a first DTM data object that is associated with the first topic set, wherein the first DTM data object represents a first mapping schema that associates a particular cluster from the group of clusters with a first topic label from the first topic set, ii) identifying that the first mapping schema of the first DTM data object associates a group of documents with the keyword corresponding to the first topic set, and iii) generating a response document set that includes the group of documents associated with the keyword via the first mapping schema of the first DTM data object and omits an additional group of documents associated with the keyword via a second mapping schema of represented by a second DTM data object, wherein the second mapping schema associates the particular cluster from the group of clusters with a second topic label from the second topic set; and providing, to the requesting computing system, the response document set including the group of documents and omitting the additional group of documents.

15. The method of claim 14, wherein the group of documents included in the response document set are included in the particular cluster from the group of clusters, and the additional group of documents omitted from the response document set are included in an additional cluster of the group of clusters, wherein the particular cluster is associated with the keyword via the first mapping schema and the additional cluster is associated with the keyword via the second mapping schema.

16. The method of claim 14, further comprising:

receiving an additional request from an additional requesting computing system, the additional request indicating the keyword;

determining that the additional requesting computing system is associated with the second topic set;

responsive to determining that the additional requesting computing system is associated with the second topic set;

iv) selecting the second DTM data object that is associated with the second topic set, and v) identifying that the second mapping schema of the second DTM data object associates the additional group of documents with the keyword corresponding to the second topic set; and providing, to the additional requesting computing system, an additional response document set.

17. The method of claim 16, wherein the response document set omits the additional group of documents associated with the keyword via the first mapping schema of the first DTM data object and includes the additional group of documents associated with the keyword via the second mapping schema of the second DTM data object.

18. The method of claim 14, further comprising:

generating, for each particular document in the multiple documents, a respective vector data object describing respective data extracted from the particular document, wherein the first set of data extracted from the first document is a first vector data object describing the data of the first document.

19. The method of claim 18, further comprising:

calculating respective vector similarity values between (i) the first vector data object describing the data of the first document and (ii) each respective vector data object describing the respective data extracted from the each particular document, wherein identifying the group of clusters that includes the multiple documents is further based on the respective vector similarity values.

20. The method of claim 14, further comprising:

calculating, for each cluster, a cluster similarity value between (i) a content term from the first set of data and (ii) the first topic label from the first topic set, wherein generating the first DTM data object is based on the cluster similarity value.

* * * * *